(12) United States Patent
Anderson et al.

(10) Patent No.: US 8,566,540 B2
(45) Date of Patent: Oct. 22, 2013

(54) DATA MIGRATION METHODOLOGY FOR USE WITH ARRAYS OF POWERED-DOWN STORAGE DEVICES

(75) Inventors: Dale Howard Anderson, Tucson, AZ (US); Philip Matthew Doatmas, Flagstaff, AZ (US); Michael Robert Groseclose, Tuscon, AZ (US); Paul Anthony Jennas, II, Tucson, AZ (US); Larry Juarez, Tucson, AZ (US); Brian Sean McCain, Mountain View, CA (US); David Montgomery, Tucson, AZ (US); Jason Lee Peipelman, Vail, AZ (US); Joshua Marshall Rhoades, Tucson, AZ (US); Todd Charles Sorenson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 525 days.

(21) Appl. No.: 12/698,557

(22) Filed: Feb. 2, 2010

(65) Prior Publication Data

US 2011/0191558 A1 Aug. 4, 2011

(51) Int. Cl.
*G06F 12/00* (2006.01)
(52) U.S. Cl.
USPC ............................ 711/162; 713/320; 711/114
(58) Field of Classification Search
USPC .................................. 711/162, 114; 713/320
See application file for complete search history.

(56) References Cited

U.S. PATENT DOCUMENTS

| | | | |
|---|---|---|---|
| 5,574,907 A * | 11/1996 | Jernigan et al. ........................ 1/1 |
| 5,600,816 A * | 2/1997 | Oldfield et al. ............... 711/113 |
| 7,098,822 B2 | 8/2006 | Augenstein et al. |
| 2006/0143419 A1 | 6/2006 | Tulyani |
| 2006/0259728 A1 | 11/2006 | Chandrasekaran et al. |
| 2007/0150690 A1 | 6/2007 | Chen et al. |
| 2008/0022277 A1 | 1/2008 | Kano |
| 2008/0172539 A1 | 7/2008 | Boss et al. |
| 2008/0266698 A1 | 10/2008 | Shibayama et al. |
| 2008/0288678 A1 | 11/2008 | Nakagawa et al. |
| 2009/0007106 A1 | 1/2009 | Araujo, Jr. et al. |
| 2009/0177836 A1 | 7/2009 | Mimatsu |
| 2010/0122050 A1 * | 5/2010 | Hutchison et al. ............ 711/162 |

OTHER PUBLICATIONS

Lee, et al., "Enhancing Data Migration Performance Via Parallel Data Compression", IEEE Computer Society, Proceedings of the 16th International Parallel and Distributed Processing Symposium, p. 142, 2002.

* cited by examiner

*Primary Examiner* — Larry Mackall
(74) *Attorney, Agent, or Firm* — Nelson and Nelson; Daniel P. Nelson; Alexis V. Nelson

(57) ABSTRACT

A method for managing extents in a data storage system includes monitoring usage statistics for an extent residing on one or more powered-up storage devices. In the event the extent has not been accessed for specified period of time (as determined from the usage statistics), the method automatically compresses the extent and migrates the extent to an intermediate repository. Once the amount of data in the intermediate repository reaches a specified level, the method migrates the extent from the intermediate repository to one or more normally powered-down storage devices. If I/O is received for the extent while it resides in the normally powered-down storage devices or the intermediate repository, the method automatically migrates the extent from the normally powered-down storage devices or the intermediate repository to the normally powered-up storage devices. A corresponding apparatus and computer program product are also disclosed.

14 Claims, 9 Drawing Sheets

DATA MIGRATION METHODOLOGY FOR USE WITH ARRAYS OF POWERED-DOWN STORAGE DEVICES

BACKGROUND

1. Field of the Invention

This invention relates to apparatus and methods for storing data, and more particularly to apparatus and methods for storing data on arrays of powered-down storage devices.

2. Background of the Invention

The emergence of the Internet and the growth of business enterprises have resulted in a dramatic increase in server-centric applications. This increase has caused an equally dramatic rise in data-centric services, such as transaction processing systems, web portals, email servers, stock trading and financial transaction systems, search engines, file servers, and the like. No longer just the domain of larger corporations, such data-centric services are becoming more prevalent with smaller business enterprises and institutions. These data-centric services are increasingly important in the global economy as millions (and perhaps even billions) of users rely on these services each day.

One thing that each of the above data-centric services has in common is that each typically relies heavily on storage systems for their data storage and processing requirements. Often, these storage systems are implemented as arrays of disk drives, tape libraries, or other storage devices. These storage systems may, in turn, be connected to networks to form storage-area-networks or network-attached storage. As data-centric services increase, reliance on storage systems of various types also increases.

Unfortunately, as reliance on storage systems continues to increase, the power consumed by the storage systems also increases. The increased power consumption can significantly increase running costs, stresses on power supplies, impacts on the environment, and device failure rates. These power costs are eventually passed on to consumers. Another side-effect of high power consumption is heat generation. As power consumption increases, more heat is generated. This heat needs to be removed one way or another, further increasing costs.

In view of the foregoing, what are needed are apparatus and methods to reduce the power consumed by storage systems and other devices. Such apparatus and methods would ideally be able to power down certain storage devices in a storage system to conserve power. Further needed are apparatus and methods to migrate infrequently-accessed data to storage devices that are powered down. Likewise, apparatus and methods are needed to retrieve, or "surface," data from powered-down storage devices when the data is needed.

SUMMARY

The invention has been developed in response to the present state of the art and, in particular, in response to the problems and needs in the art that have not yet been fully solved by currently available apparatus and methods. Accordingly, the invention has been developed to provide apparatus and methods for storing data on arrays of powered-down storage devices. The features and advantages of the invention will become more fully apparent from the following description and appended claims, or may be learned by practice of the invention as set forth hereinafter.

Consistent with the foregoing, a method for managing extents in a data storage system is disclosed herein. In certain embodiments, such a method includes monitoring usage statistics for an extent residing on one or more powered-up storage devices. In the event the extent has not been accessed for specified period of time (as determined from the usage statistics), the method automatically compresses the extent and migrates the extent to an intermediate repository. Once the amount of data in the intermediate repository reaches a specified level, the method migrates the extent from the intermediate repository to one or more normally powered-down storage devices. If I/O is received for the extent while it resides in the normally powered-down storage devices or the intermediate repository, the method automatically migrates the extent from the normally powered-down storage devices or the intermediate repository to the normally powered-up storage devices.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
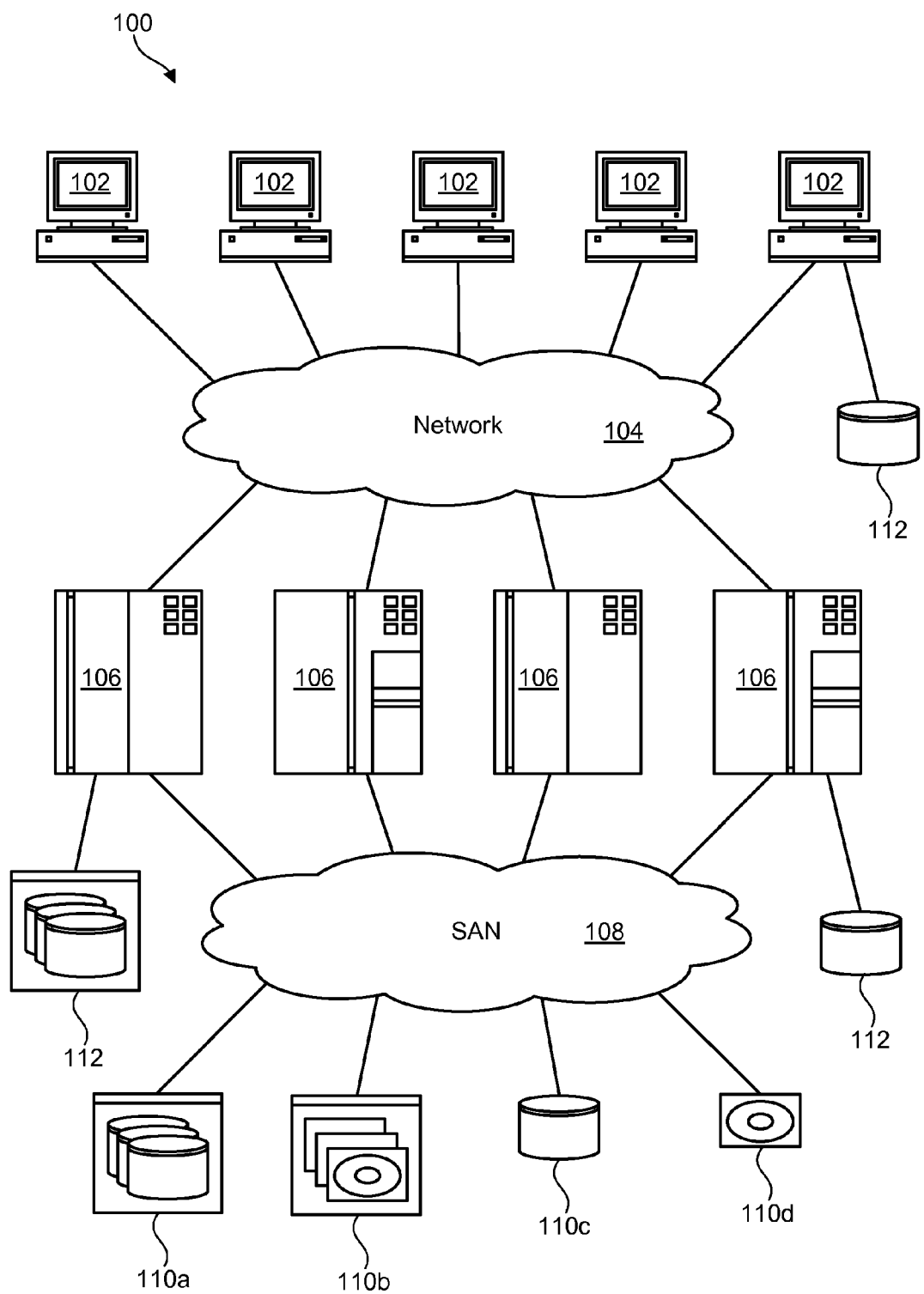
FIG. 1 is a high-level block diagram showing one example of a network architecture including one or more storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where a data migration methodology in accordance with the invention may be implemented. The network architecture 100 is presented only by way of example and is not intended to be limiting. Indeed, the data migration methodology disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may utilize the data migration methodology described herein to store and manage data in the storage systems 112.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. Where the network 108 is a SAN, the servers 106 and storage systems 110 may communicate using a networking standard such as Fibre Channel (FC). One or more of the storage systems 110 may utilize the data migration methodology disclosed herein to store and manage data.

Figure 2:
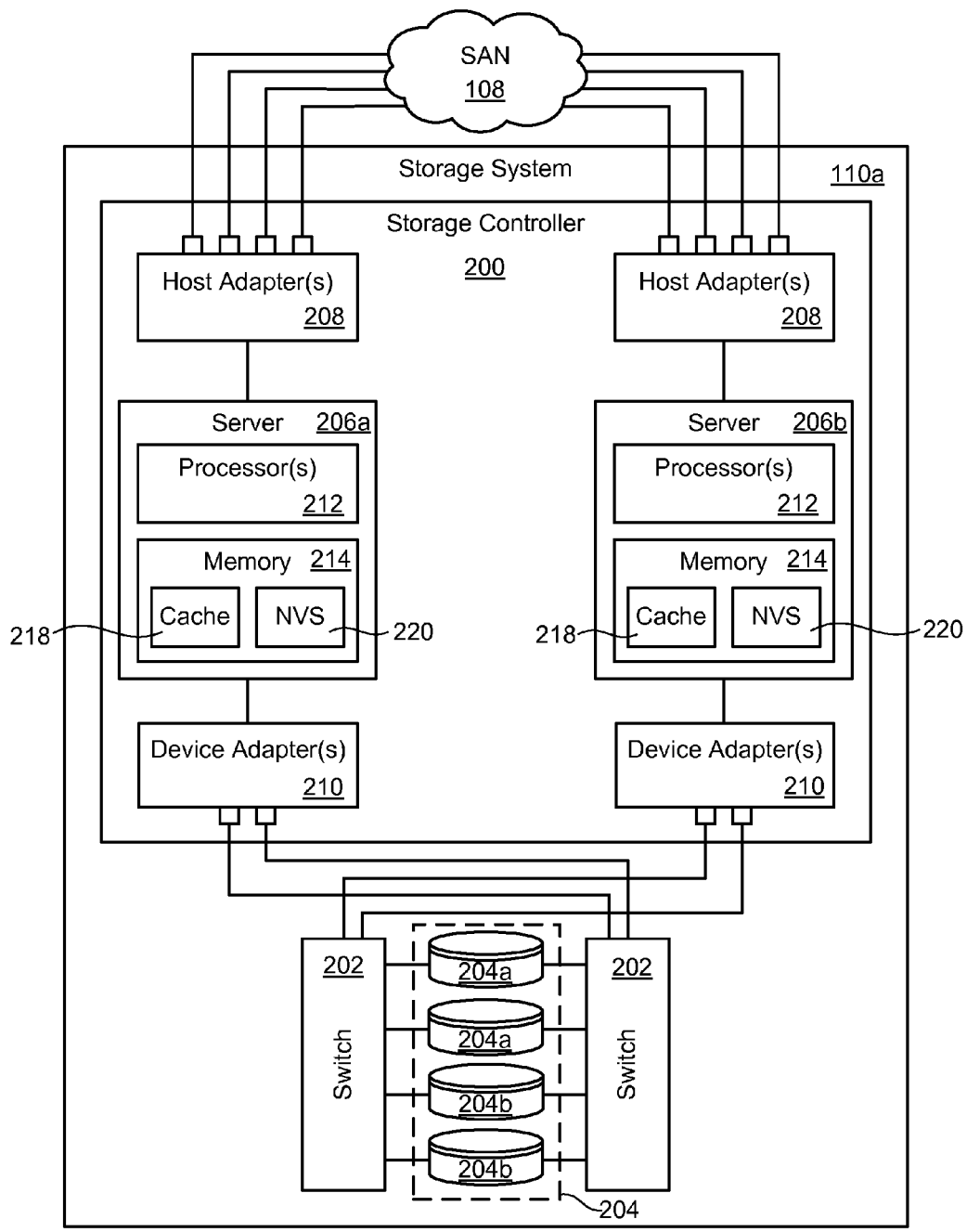
FIG. 2 is a high-level block diagram showing one example of a storage system where a data migration methodology in accordance with the invention may be implemented.

Referring to FIG. 2, one embodiment of a storage system 110a containing an array of storage devices 204 (e.g., hard-disk drives 204 and/or solid-state drives 204) is illustrated. The internal components of the storage system 110a are shown since the data migration methodology may, in certain embodiments, be implemented within such a storage system 110a, although the data migration methodology may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

In selected embodiments, the storage device 204 may include both normally powered-up storage devices 204a and normally powered-down storage devices 204b. As will be explained in more detail hereafter, data that is cold (e.g., not accessed for a specified period of time) may be compressed and migrated from the normally powered-up storage devices 204a to the normally powered-down storage devices 204b. Similarly, when I/O is received for cold data in the normally powered-down storage devices 204b, the data may be surfaced to the normally powered-up storage devices 204a.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the data migration methodology disclosed herein is not limited to the IBM DS8000™ enterprise storage system 110a, but may be implemented in any comparable or analogous storage system 110, regardless of the manufacturer, product name, or components or component names associated with the storage system 110. Any storage system 110 that could benefit from one or more embodiments of the invention is deemed to fall within the scope of the invention. Thus, the IBM DS8000™ is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In selected embodiments, the memory 214 includes a cache 218. Whenever a host 106 (e.g., an open system or mainframe server 106) performs a read operation, the server 206 that performs the read may fetch data from the storages devices 204 and save it in its cache 218 in the event it is required again. If the data is requested again by a host 106, the server 206 may fetch the data from the cache 218 instead of fetching it from the storage devices 204, saving both time and resources. Similarly, when a host 106 performs a write, the server 106 that receives the write request may store the write in its cache 218 and destage the write to the storage devices 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
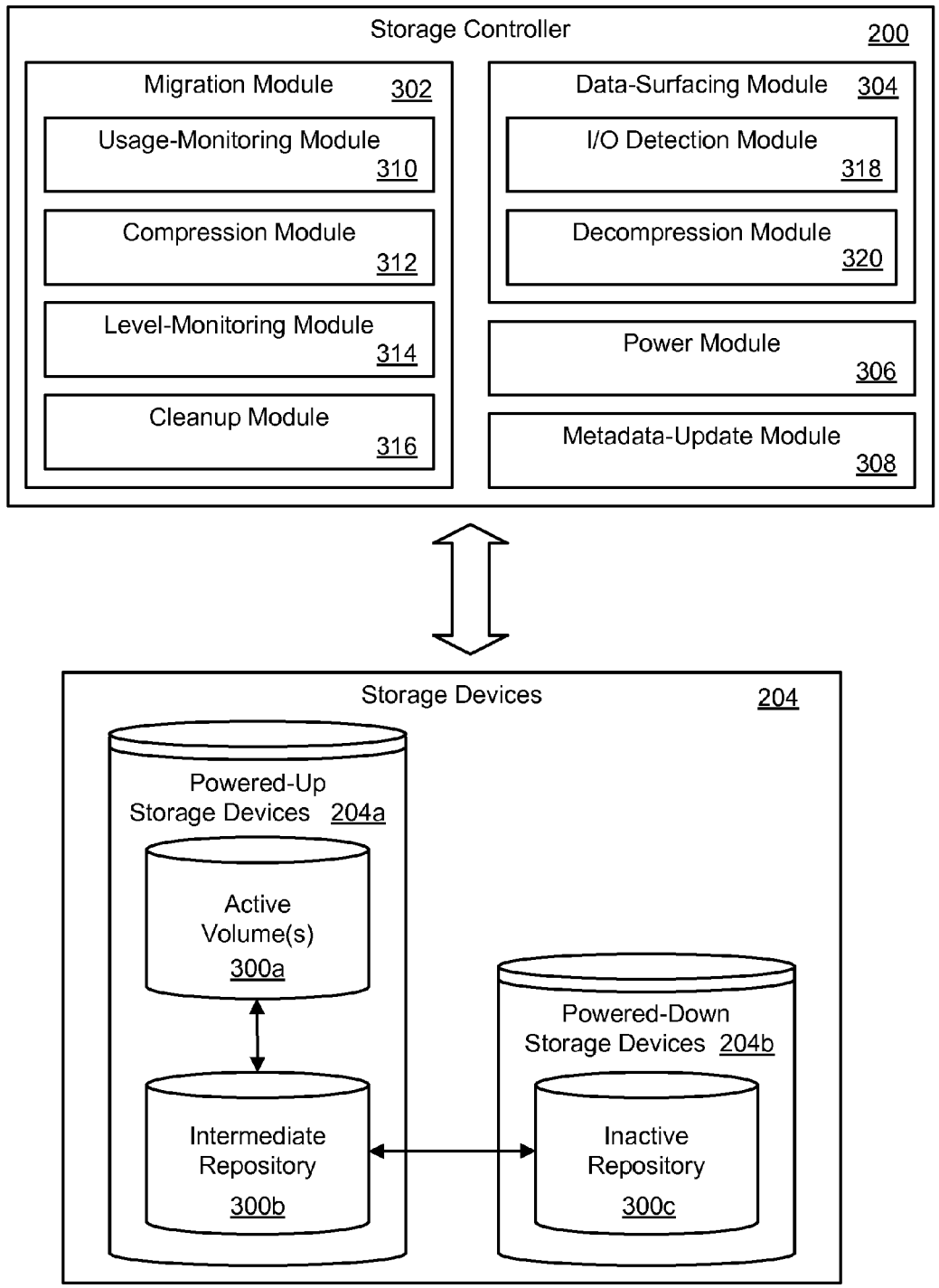
FIG. 3 is a high-level block diagram showing various modules and tiers of storage that may be implemented within a storage system.

Referring to FIG. 3, the data migration methodology described herein may be implemented in the form of one or more modules. These modules may be implemented in hardware, software or firmware executable on hardware, or a combination thereof. These modules are presented only by way of example and are not intended to be limiting. Indeed, alternative embodiments may include more or fewer modules than those illustrated. Furthermore, it should be recognized that the functionality of some modules may be broken into multiple modules or, conversely, the functionality of several modules may be combined into a single module or fewer modules.

As previously explained, the storage devices 204 within the storage system 110a may include both normally powered-up storage devices 204a and normally powered-down storage devices 204b. In selected embodiments, three tiers of storage may be established within the normally powered-up storage devices 204a and the normally powered-down storage devices 204b. For example, a first storage tier comprising one or more active volumes 300a may be established within the normally powered-up storage devices 204a. These active volumes 300a may store extents that are actively being read from and/or written to. For the purposes of this disclosure, the term "extent" is used to refer to a block of storage space in the storage devices 204 that is used to store data. In certain embodiments, the extents are substantially uniform in size (e.g., 1 GB blocks) although the size of the extents may be adjusted as needed.

A second storage tier may include an intermediate repository 300b to store extents that have become cold (have not been read from or written to for a specified period of time). Like the active volumes 300a, the intermediate repository 300b may reside on the powered-up storage devices 300a. The extents in the intermediate repository 300b may be compressed to efficiently utilize space in the intermediate repository 300b.

Similarly, a third storage tier may include an inactive repository 300c residing on the normally powered-down storage devices 204a. The inactive repository 300c may store compressed extents that have been dumped from the intermediate repository 300b when the amount of data in the intermediate repository 300b reaches some specified level. The manner in which data is transferred between the active volumes 300a, the intermediate repository 300b, and the inactive repository 300c will be explained in more detail hereafter.

As shown in FIG. 3, one or more modules in the storage controller 200 may be used to implement the data migration methodology disclosed herein. These modules may be used to migrate extents between the active volumes 300a, the intermediate repository 300b, and the inactive repository 300c. More specifically, as data becomes cold, a migration module 302 may be used to migrate extents from the active volumes 300a to the intermediate repository 300b, and from the intermediate repository 300b to the inactive repository 300c. Similarly, when I/O is received for cold extents in the inactive repository 300c or the intermediate repository 300b, a data-surfacing module 304 may be used to migrate, or "surface," the extents to the active volumes 300a.

In selected embodiments, the migration module 302 may include a usage-monitoring module 310 to monitor the usage of extents residing in the active volumes 300a. More specifically, the usage-monitoring module 310 may monitor the amount of time that has elapsed since an extent was last accessed. When an extent has not been accessed for x amount of time (where x is a user-modifiable setting), a compression module 312 may compress the extent and the migration module 302 may migrate the compressed extent to the intermediate repository 300b.

Similarly, as the intermediate repository 300b fills up with data, a level-monitoring module 314 may monitor the amount of data in the intermediate repository 300b. If the amount of data in the intermediate repository 300b reaches some specified level y (e.g., the intermediate repository 300b is y percent full, where y is a user-modifiable setting), the migration module 302 may migrate all of the compressed extents in the intermediate repository 300b to the inactive repository 300c. A power module 306 may be used to power up the normally powered-down storage devices 204b while the extents are transferred to the inactive repository 300c, and then power down the storage devices 204b thereafter. In certain embodiments, the power module 306 is configured to only power up those storage devices 204b that will actually store the extent as opposed to powering up all the normally powered-down storage devices 204b.

By waiting for the intermediate repository 300b to reach some specified level y before transferring data to the inactive repository 300c, the data migration methodology will minimize or otherwise reduce the number of times the normally powered-down storage devices 204b are powered up and down. In other words, by transferring data from the intermediate repository 300b to the inactive repository 300c in larger chunks, the frequency of powering up and powering down the storage devices 204b may be reduced significantly. This will significantly improve performance and may reduce storage-device failure rates caused by frequent power cycling.

In certain embodiments, a cleanup module 316 may be used to cleanup the inactive repository 300a when data is transferred thereto. For example, the cleanup module 316 may reclaim storage space in the inactive repository 300c that was previously occupied by extents that have since been transferred out of the inactive repository 300c. This reclaimed space may be used to store new extents from the intermediate repository 300b. In certain embodiments, the cleanup module 300b may rearrange extents residing in the inactive repository 300c (e.g., by defragmenting the extents, etc.) prior to transferring new extents into the inactive repository 300c. Alternatively, new extents may be transferred into the inactive repository 300c first and then the new and existing extents may be defragmented together.

In selected embodiments, a data-surfacing module 304 includes an I/O detection module 318 to detect when an I/O (a read or write) is received for an extent residing in the inactive repository 300c or the intermediate repository 300b. When such an I/O is detected, the data-surfacing module 304 retrieves the extent from the inactive repository 300c or intermediate repository 300b, depending on where the extent is located. If the extent is retrieved from the inactive repository 300c, the power module 306 may power up the normally powered-down storage devices 204a while the extent is transferred, and power down the storage devices 204a thereafter. In certain embodiments, the power module 306 only powers up those storage devices 204b that actually contain the extent as opposed to powering up all the storage devices 204b. A decompression module 320 decompresses the extent and the data-surfacing module 304 migrates the decompressed extent to the active volumes 300a. This may include placing the extent in cache 218 as will be described in more detail in association with FIGS. 6 through 9.

Each time an extent is migrated between the active volumes 300a, the intermediate repository 300b, and the inactive repository 300c, a metadata-update module 308 may modify metadata for the extent to point to the extent's new location. This will enable the storage controller 200 to determine where the extent is located when the next I/O for the extent is received.

Referring to FIG. 4 through 9, several different methods are illustrated to show various steps that may be taken when migrating extents between the active volumes 300a, the intermediate repository 300b, and the inactive repository 300c. The migration module 302 may use the methods illustrated in FIGS. 4 and 5 to migrate extents from the active volumes 300a to the intermediate repository 300b, and from the intermediate repository 300b to the inactive repository 300c, respectively. Similarly, the data-surfacing module 304 may use the methods illustrated in FIG. 6 through 9 to migrate extents from the intermediate repository 300b or inactive repository 300c to the active volumes 300a upon receiving I/O for extents contained therein.

Figure 4:
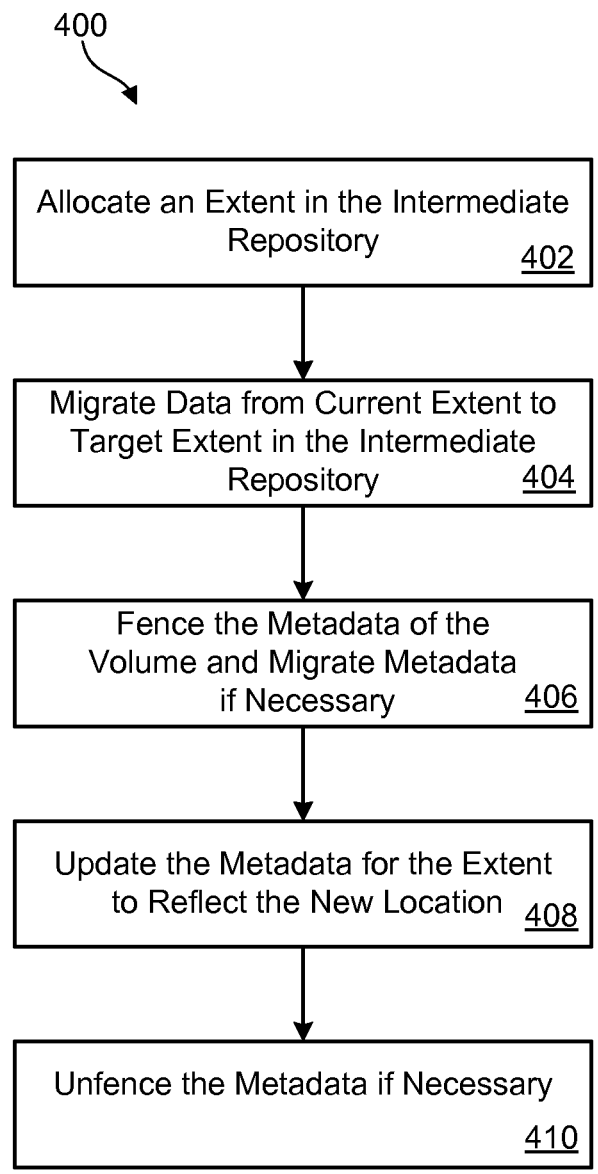
FIG. 4 is a flow diagram showing one embodiment of a method for migrating an extent from active volumes to an intermediate repository.

Referring to FIG. 4, one embodiment of a method 400 for migrating an extent from the active volumes 300a to the intermediate repository 300b is illustrated. As shown, the method 400 initially allocates 402 an extent in the intermediate repository 300b. The method 400 then migrates 404 data from the current extent in the active volumes 300a to the target extent in the intermediate repository 300b. Once the data transfer is complete, the method 400 fences 406 the metadata (temporarily places a lock on the metadata) of the volumes 300a and migrates the metadata if necessary. The method 400 then updates 408 the metadata for the extent to point to the intermediate repository 300b. The method 400 then unfences 410 the metadata if necessary.

Figure 5:
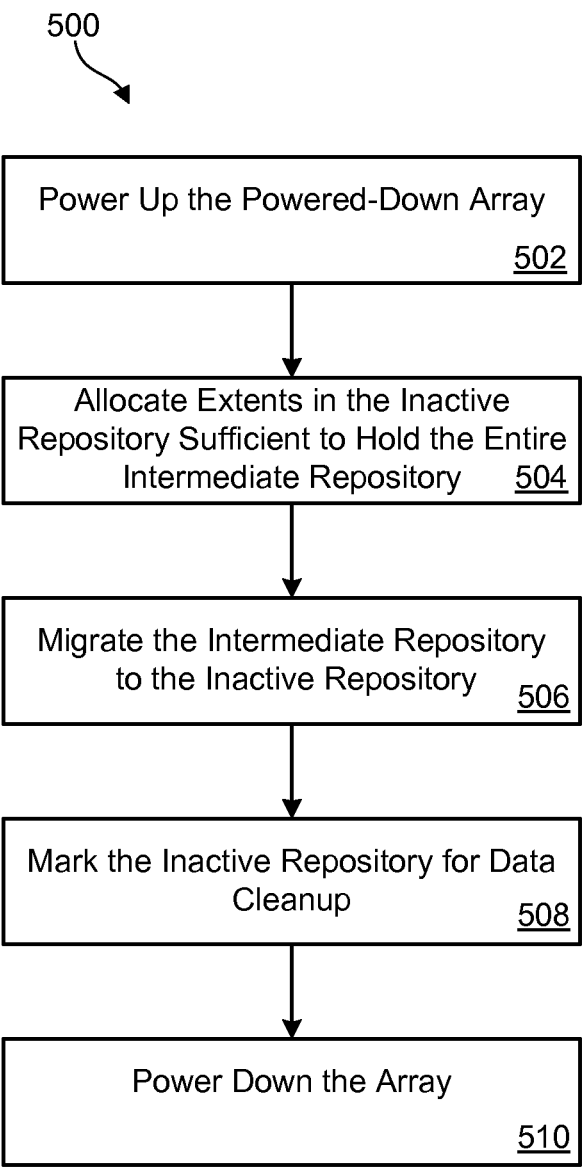
FIG. 5 is a flow diagram showing one embodiment of a method for migrating an extent from the intermediate repository to an inactive repository residing on one or more normally powered-down storage devices.

Referring to FIG. 5, one embodiment of a method 500 for migrating an extent from the intermediate repository 300b to the inactive repository 300c is illustrated. As shown, the method 500 initially powers up 502 one or more of the normally powered-down storage devices 204b in the array. The method 500 then allocates 504 extents in the inactive repository 300c sufficient to hold all the data in the intermediate repository 300b. The method 500 then migrates 506 the compressed extents in the intermediate repository 300b to the inactive repository 300c. The method then marks 508 the extents in the inactive repository 300c for data cleanup, which may happen in the background. The method 500 then powers down 510 the array of storage devices 204b.

Figure 6:
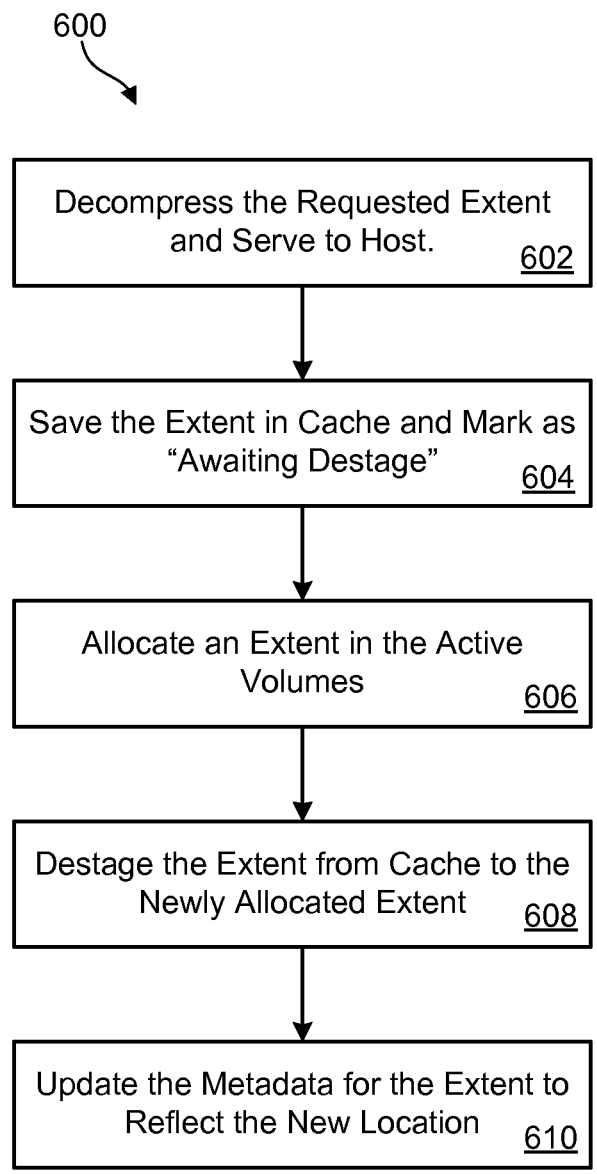
FIG. 6 is a flow diagram showing one embodiment of a method for migrating an extent from the intermediate repository to the active volumes upon receiving a read command for the extent.

Referring to FIG. 6, one embodiment of a method 600 for migrating an extent from the intermediate repository 300b to the active volumes 300a in response to a read command is illustrated. As shown, upon receiving a read command for an extent in the intermediate repository 300b, the method 600 decompresses 602 the extent and serves the decompressed extent to the host 106 that generated the read command. The method 600 then saves 604 the extent in cache 218 and marks 604 the cache entry as "awaiting destage." The method 600 then allocates 606 an extent in the active volumes 300a and destages 608 the extent from cache 218 to the newly allocated extent. The method 600 then updates 610 the metadata for the extent to reflect the new location of the extent.

Figure 7:
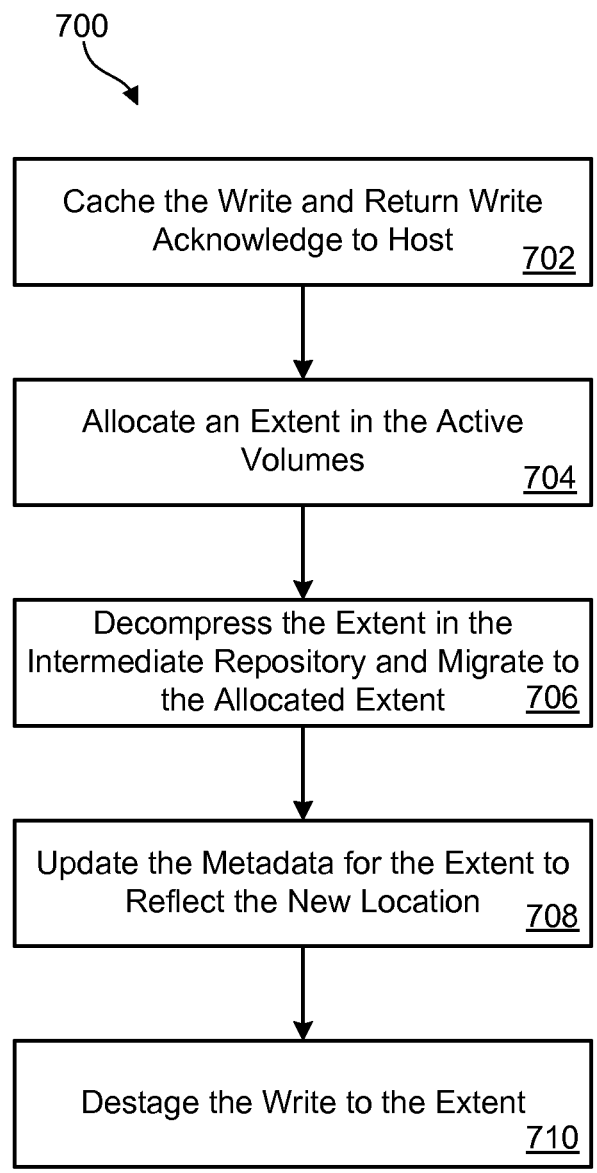
FIG. 7 is a flow diagram showing one embodiment of a method for migrating an extent from the intermediate repository to the active volumes upon receiving a write command for the extent.

Referring to FIG. 7, one embodiment of a method 700 for migrating an extent from the intermediate repository 300b to the active volumes 300a in response to a write command is illustrated. As shown, upon receiving a write command for an extent in the intermediate repository 300b, the method 700 caches 702 the write and returns 702 a write acknowledge to the host 106 indicating that the write completed successfully. The method 700 then allocates 704 an extent in the active volumes 300a. The method 700 then decompresses 706 the extent in the intermediate repository 300b and migrates 706 the extent to the newly allocated extent in the active volumes 300a. The method 700 then updates 708 the metadata for the extent to reflect the new location of the extent. The method 700 then destages 710 the write in cache 218 to the allocated extent in the active volumes 300a.

Figure 8:
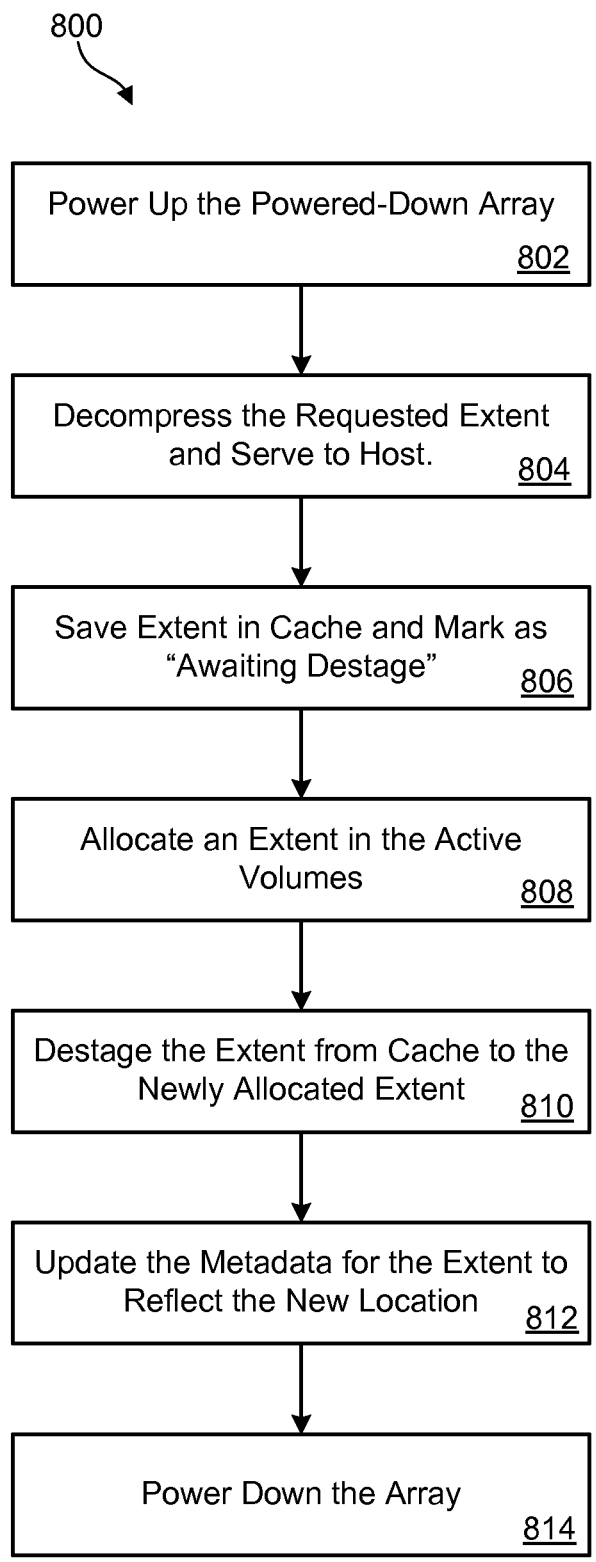
FIG. 8 is a flow diagram showing one embodiment of a method for migrating an extent from the inactive repository to the active volumes upon receiving a read command for the extent.

Referring to FIG. 8, one embodiment of a method 800 for migrating an extent from the inactive repository 300c to the active volumes 300a in response to a read command is illustrated. As shown, upon receiving a read command for an extent in the intermediate repository 300b, the method 800 powers up 802 the normally powered-down storage devices 204b. The method 800 then decompresses 804 the requested extent and serves 804 the decompressed extent to the host 106 that generated the read command. The method 800 then saves 806 the extent in cache 218 and marks 806 the cache entry as "awaiting destage." The method 800 then allocates 808 an extent in the active volumes 300a and destages 810 the extent from cache 218 to the newly allocated extent. The method 800 then updates 812 the metadata for the extent to reflect the new location of the extent. The method 800 then powers down 814 the normally powered-down storage devices 204b.

Figure 9:
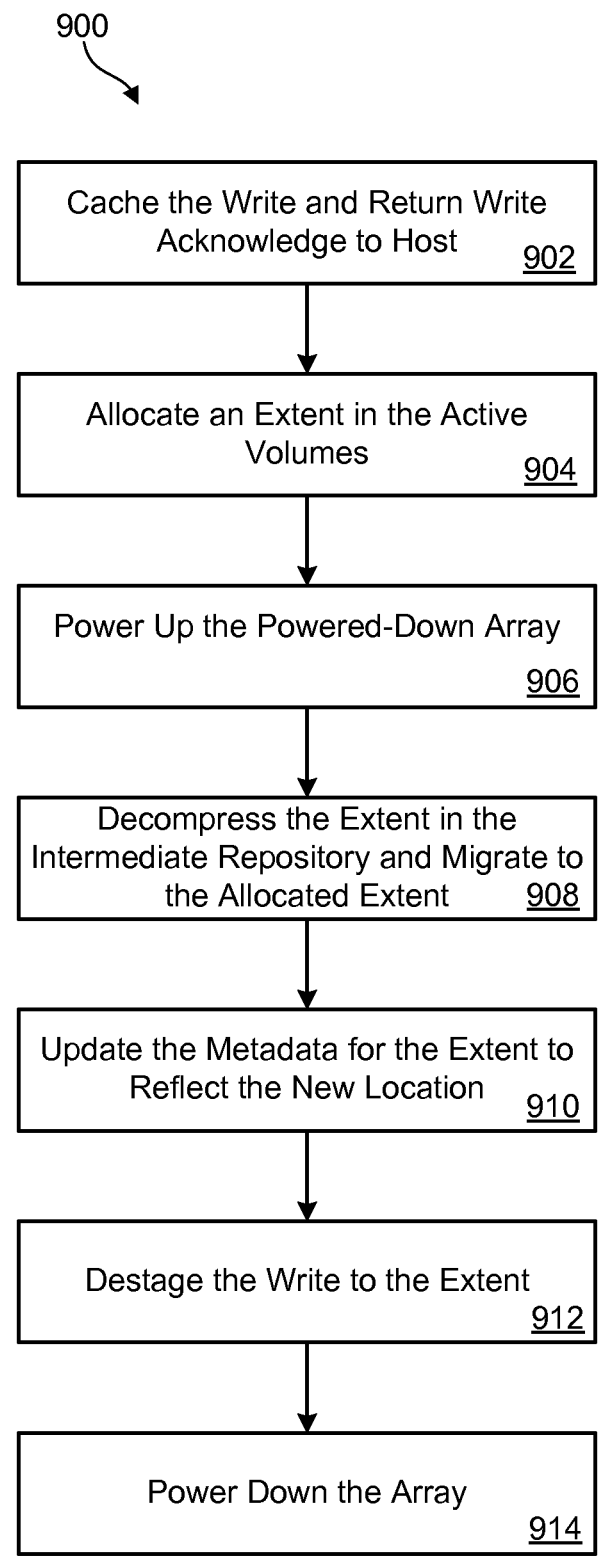
FIG. 9 is a flow diagram showing one embodiment of a method for migrating an extent from the inactive repository to the active volumes upon receiving a write command for the extent.

Referring to FIG. 9, one embodiment of a method 900 for migrating an extent from the inactive repository 300c to the active volumes 300a in response to a write command is illustrated. As shown, upon receiving a write for an extent in the inactive repository 300c, the method 900 caches 902 the write and returns 902 a write acknowledge to the host 106 indicating that the write completed successfully. The method 900 then allocates 904 an extent in the active volumes 300a and powers up 906 the normally powered-down storage devices 204b that store the extent. The method 900 then decompresses 908 the requested extent in the inactive repository 300c and migrates 908 the extent to the newly allocated extent in the active volumes 300a. The method 900 then updates 910 the metadata for the extent to reflect the new location of the extent. The method 900 then destages 912 the write in cache 218 to the allocated extent in the active volumes 300a. The method 900 then powers down 914 the normally powered-down storage devices 204b.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product for managing extents in a data storage system, the computer program product comprising a non-transitory computer-readable storage medium having computer-usable program code embodied therein, the computer-usable program code comprising:
computer-usable program code to monitor usage statistics for extents residing on at least one normally powered-up storage device;
computer-usable program code to identify, using the usage statistics, "cold" extents in the at least one normally powered-up storage device that have not been accessed for a specified period of time;
computer-usable program code to automatically compress the "cold" extents and migrate the "cold" extents from the at least one normally powered-up storage device to an intermediate repository, the intermediate repository storing "cold extents" in preparation for migration to at least one normally powered-down storage device;
computer-usable program code to automatically migrate the "cold" extents from the intermediate repository to the at least one normally powered-down storage device in the event the amount of data in the intermediate repository reaches a specified level; and
computer-usable program code to automatically migrate extents from the at least one normally powered-down storage device to the at least one normally powered-up storage device in the event I/O is received for the extents.

2. The computer program product of claim 1, further comprising computer-usable program code to clean up the at least one normally powered-down storage device upon migrating the "cold" extents from the intermediate repository to the at least one normally powered-down storage device.

3. The computer program product of claim 1, further comprising computer-usable program code to temporarily power up the at least one normally powered-down storage device when migrating the "cold" extents from the intermediate repository to the at least one normally powered-down storage device.

4. The computer program product of claim 1, further comprising computer-usable program code to temporarily power up the at least one normally powered-down storage device when migrating extents from the at least one normally powered-down storage device to the at least one normally powered-up storage device.

5. The computer program product of claim 1, further comprising computer-usable program code to decompress extents upon migrating the extents from the at least one normally powered-down storage device to the at least one normally powered-up storage device.

6. The computer program product of claim 1, further comprising computer-usable program code to update metadata associated with extents upon moving the extents between the at least one normally powered-up storage device, the temporary repository, and the at least one normally powered-down storage device.

7. The computer program product of claim 1, further comprising computer-usable program code to write extents to cache and destage the extents from cache to the at least one normally powered-up storage device when migrating the extents from the at least one normally powered-down storage device to the at least one normally powered-up storage device.

8. An apparatus for managing extents in a data storage system, the apparatus comprising:
a plurality of modules implemented in at least one of hardware and software operating hardware, the plurality of modules comprising:
a usage-monitoring module to monitor usage statistics for extents residing on at least one normally powered-up storage device, and to identify, using the usage statistics, "cold" extents in the at least one normally powered-up storage device that have not been accessed for a specified period of time;
a compression module to automatically compress the "cold" extents and a migration module to migrate the "cold" extents from the at least one normally powered-up storage device to an intermediate repository, the intermediate repository storing "cold extents" in preparation for migration to at least one normally powered-down storage device;

the migration module further configured to automatically migrate the "cold" extents from the intermediate repository to the at least one normally powered-down storage device in the event the amount of data in the intermediate repository reaches a specified level; and a data-surfacing module to automatically migrate extents from the at least one normally powered-down storage device to the at least one normally powered-up storage device in the event I/O is received for the extents.

9. The apparatus of claim 8, further comprising a cleanup module to clean up the at least one normally powered-down storage device upon migrating the "cold" extents from the intermediate repository to the at least one normally powered-down storage device.

10. The apparatus of claim 8, further comprising a power module to temporarily power up the at least one normally powered-down storage device when migrating the "cold" extents from the intermediate repository to the at least one normally powered-down storage device.

11. The apparatus of claim 10, wherein the power module is further configured to temporarily power up the at least one normally powered-down storage device when migrating extents from the at least one normally powered-down storage device to the at least one normally powered-up storage device.

12. The apparatus of claim 8, further comprising a decompression module to decompress extents upon migrating the extents from the at least one normally powered-down storage device to the at least one normally powered-up storage device.

13. The apparatus of claim 8, further comprising a meta-data-update module to update metadata associated with extents upon moving the extents between the at least one normally powered-up storage device, the temporary repository, and the at least one normally powered-down storage device.

14. The apparatus of claim 8, wherein the data-surfacing module is further configured to write extents to cache when migrating the extents from the at least one normally powered-down storage device to the at least one normally powered-up storage device.

* * * * *